(12) United States Patent
Garware et al.

(10) Patent No.: US 7,883,777 B2
(45) Date of Patent: Feb. 8, 2011

(54) SOLAR ENERGY SHIELDING WINDOW FILM LAMINATES

(75) Inventors: Shashikant Bhalchandra Garware, Mumbai (IN); Mohan Sitaram Adsul, Aurangabad (IN)

(73) Assignee: Garware Polyester Ltd., Mumbai (IN)

( * ) Notice: Subject to any disclaimer, the term of this patent is extended or adjusted under 35 U.S.C. 154(b) by 699 days.

(21) Appl. No.: 11/496,108

(22) Filed: Jul. 31, 2006

(65) Prior Publication Data

US 2007/0223097 A1 Sep. 27, 2007

(51) Int. Cl.
| | | |
|---|---|---|
| B32B 15/09 | (2006.01) | |
| B32B 15/095 | (2006.01) | |
| B32B 27/20 | (2006.01) | |
| B32B 27/36 | (2006.01) | |
| B32B 27/40 | (2006.01) | |

(52) U.S. Cl. .............. 428/423.7; 428/423.1; 428/425.8; 428/425.9; 428/457; 428/458; 428/480; 428/343; 428/352; 524/401; 524/403; 524/404; 524/406; 524/413; 524/434; 524/435; 359/350; 359/357; 359/361; 106/400; 106/440; 106/456

(58) Field of Classification Search ........................ None
See application file for complete search history.

(56) References Cited

U.S. PATENT DOCUMENTS

| | | | | |
|---|---|---|---|---|
| 3,899,621 | A | * | 8/1975 | Willdorf ..................... 428/216 |
| 4,399,265 | A | * | 8/1983 | Garware et al. ........... 528/308.2 |
| 4,430,366 | A | | 2/1984 | Crawford et al. |
| 4,465,736 | A | * | 8/1984 | Nishihara et al. ............ 428/332 |
| 4,473,980 | A | * | 10/1984 | Foster .......................... 52/202 |
| 4,705,721 | A | * | 11/1987 | Frisch et al. ................. 428/349 |
| 4,741,961 | A | * | 5/1988 | Frisch et al. ................. 428/412 |
| 4,797,317 | A | * | 1/1989 | Oliver et al. ................. 428/204 |
| 5,024,895 | A | * | 6/1991 | Kavanagh et al. ............ 428/437 |
| 5,049,427 | A | * | 9/1991 | Starzewski et al. .......... 428/40.4 |
| 5,145,746 | A | * | 9/1992 | Tomoyuki .................... 428/458 |
| 5,427,842 | A | * | 6/1995 | Bland et al. .................. 428/213 |
| 5,512,215 | A | | 4/1996 | Tachizono et al. |
| 5,518,810 | A | * | 5/1996 | Nishihara et al. ............ 428/328 |
| 5,792,560 | A | * | 8/1998 | Friedman et al. ............ 428/441 |
| 5,979,932 | A | * | 11/1999 | Jourdaine et al. ........ 280/730.2 |

(Continued)

FOREIGN PATENT DOCUMENTS

JP 09-076392 * 3/1997

*Primary Examiner*—Vivian Chen
(74) *Attorney, Agent, or Firm*—Holland & Bonzagni, P.C.; Mary R. Bonzagni, Esq.

(57) ABSTRACT

The invention relates to solar energy shielding window film laminates exhibiting visual light transmittance in the range of 5 to 80% with minimum progressive fading or degradation of reflective quality wherein base polyester films have a layer of adhesive sandwiched there between, the adhesive layer containing dispersed mixed metal oxides as solar-energy-screen particles optionally in combination with rare earth hexaborides, antimony containing metal oxide, indium containing metal oxide, titanium nitride, or carbon particles either singly or in combinations thereof. The process for preparation of these laminates involves steps of selecting a polyester (PET) substrate; coating it with an adhesive formulation containing the dispersed mixed metal oxides as solar-energy-screen particles and other additives followed by lamination with a second PET film; applying a UV hard coat layer on one side of the PET film laminate and applying pressure sensitive adhesive on a side opposite the UV hard coat layer of the laminate followed by lamination with a release sheet.

32 Claims, 3 Drawing Sheets

U.S. PATENT DOCUMENTS

| | | | |
|---|---|---|---|
| 6,040,061 A * | 3/2000 | Bland et al. | 428/480 |
| 6,107,360 A * | 8/2000 | Kaneko et al. | 522/81 |
| 6,191,884 B1 * | 2/2001 | Takizawa et al. | 359/359 |
| 6,216,531 B1 | 4/2001 | Zhou | |
| 6,242,081 B1 * | 6/2001 | Endo | 428/212 |
| 6,294,251 B1 * | 9/2001 | Minagawa et al. | 428/354 |
| 6,316,531 B1 | 11/2001 | Garware et al. | |
| 6,319,613 B1 * | 11/2001 | Takeda et al. | 428/412 |
| 6,404,543 B1 * | 6/2002 | Shoshi et al. | 359/350 |
| 6,432,522 B1 * | 8/2002 | Friedman et al. | 428/212 |
| 6,546,692 B1 * | 4/2003 | Duncan et al. | 52/786.11 |
| 6,548,177 B2 * | 4/2003 | Hieda et al. | 428/441 |
| 6,569,517 B1 * | 5/2003 | McGurran et al. | 428/323 |
| 6,620,477 B2 * | 9/2003 | Nagai | 428/46 |
| 6,620,872 B2 * | 9/2003 | Fisher | 524/403 |
| 6,713,185 B2 * | 3/2004 | Carlson et al. | 428/426 |
| 6,733,872 B2 * | 5/2004 | Nagai | 428/215 |
| 6,833,184 B2 * | 12/2004 | Damnjanovic et al. | 428/323 |
| 6,911,254 B2 * | 6/2005 | Fisher et al. | 428/328 |
| 6,953,618 B2 * | 10/2005 | Enniss et al. | 428/212 |
| 7,208,206 B2 * | 4/2007 | Hieda et al. | 428/1.5 |
| 7,223,467 B2 * | 5/2007 | Kunugihara | 428/328 |
| 7,465,496 B2 * | 12/2008 | Park et al. | 428/403 |
| 7,759,414 B2 * | 7/2010 | Hayes et al. | 523/351 |
| 2001/0046595 A1 * | 11/2001 | Moran et al. | 428/212 |
| 2002/0061395 A1 * | 5/2002 | Moran et al. | 428/215 |
| 2003/0031835 A1 * | 2/2003 | Seto et al. | 428/174 |
| 2003/0054160 A1 * | 3/2003 | Fisher et al. | 428/328 |
| 2004/0131845 A1 * | 7/2004 | Fujita | 428/328 |
| 2004/0157048 A1 * | 8/2004 | Nagai | 428/215 |
| 2005/0203233 A1 * | 9/2005 | Fugiel et al. | 524/434 |
| 2006/0008640 A1 * | 1/2006 | Chonan et al. | 428/328 |

* cited by examiner

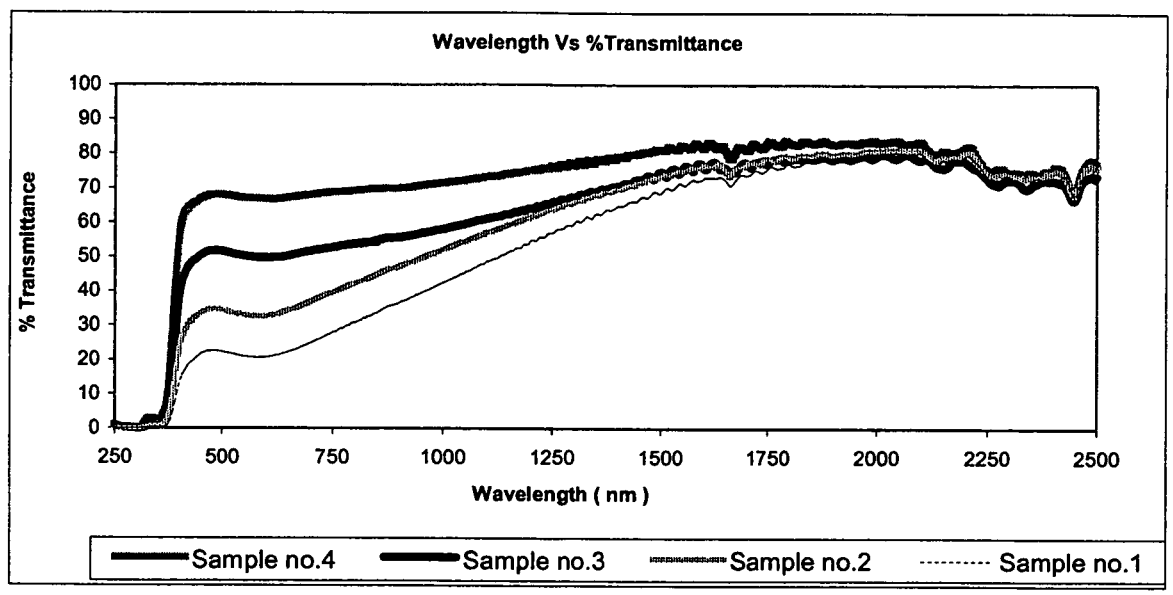
Fig.no.1

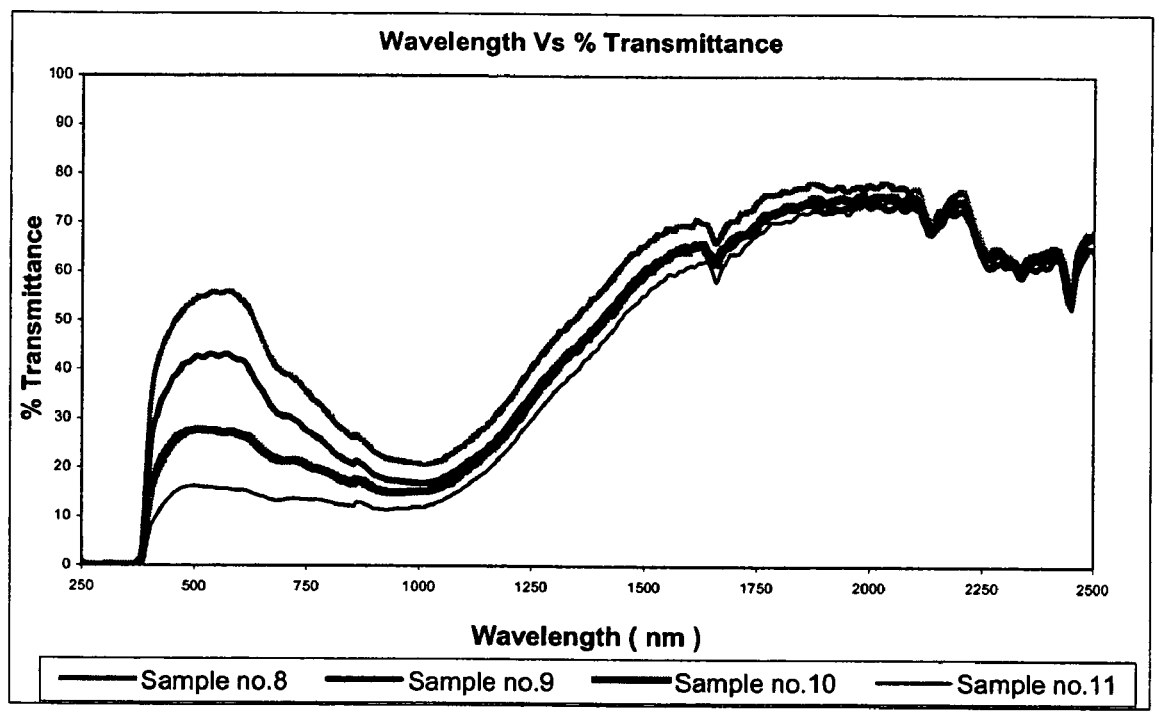
Fig.no.2

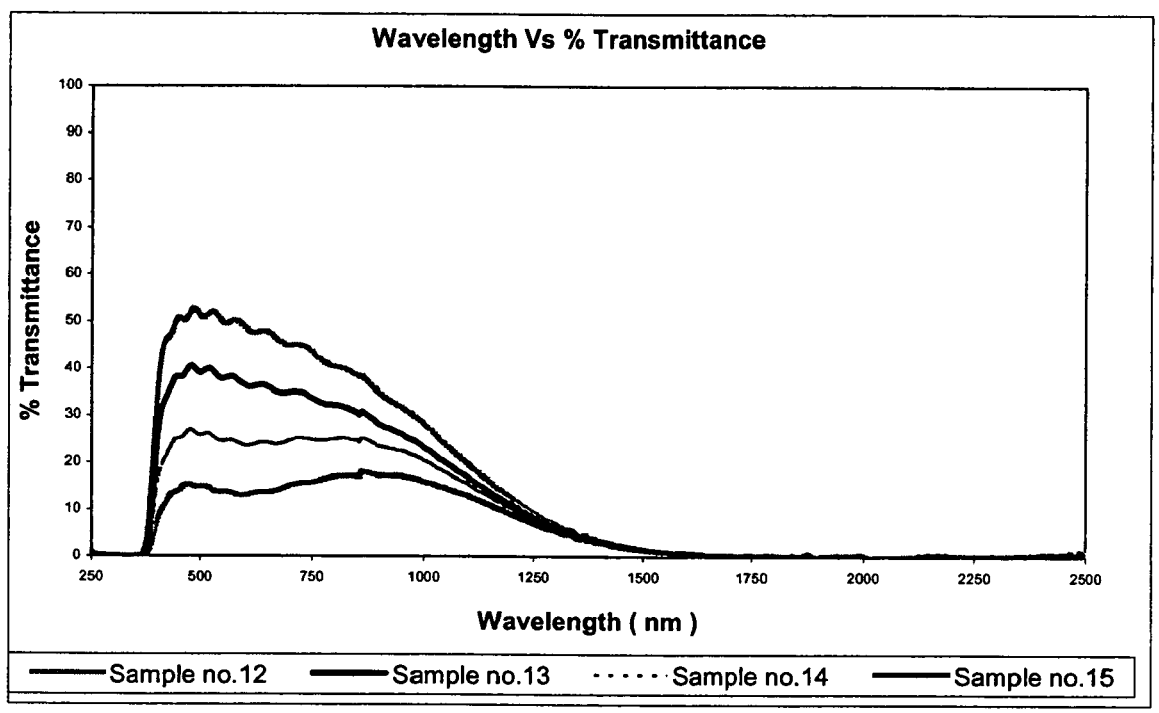
Fig.no.3

SOLAR ENERGY SHIELDING WINDOW FILM LAMINATES

RELATED APPLICATION

This application claims priority from Indian Patent Application No. 408/MUM/2006, filed Mar. 23, 2006, which is incorporated by reference herein in its entirety.

FIELD OF THE INVENTION

This invention relates to solar energy shielding multi layered polyester film laminates with sandwiched adhesive layer containing dispersed mixed metal oxides as solar-energy-screen particles to exhibit desired transmittance in the visible region and at the same time producing minimum transmittance in the near-infrared region without progressive fading or degradation of reflective quality.

BACKGROUND OF THE INVENTION

Conventional solar control films are generally made by metallizing a thin layer of aluminum metal on polymeric film substrates, usually polyester (PET) and laminating it with a second colored PET film. The films are installed on an interior surface of window glasses. The product is designed to fulfill needs of solar energy control permitting required visible light transmittance. The acceptable limits of Visible Light Transmittance (VLT) and Reflectance in desired colors is achieved by combination of colored films and aluminum metallized films.

Commercially available films are with VLT ranging from 3% to 70%. The window film laminate consists of optically clear, distortion free PET film with thickness of 23 microns (μ) to 300μ coated with acrylic base pressure sensitive adhesive and protected with a release liner.

The colors and ultraviolet (UV) stabilizers are incorporated in the polymer matrix. The design of the product allows optimum control of the electromagnetic spectrum passing through the window glasses of automobiles and buildings. UV portion of electromagnetic spectrum is absorbed by UV absorbers incorporated in the polymer matrix and pressure sensitive adhesive. Visible light is controlled by appropriate combination of Blue, Red & Yellow absorbing materials incorporated in the PET film. These films have low haze and high clarity. However, prolonged exposure to natural weather conditions lead to fading of the film.

As yellow is more prone to fading, UV stabilizers, heat stabilizers, hindered amine stabilizers are added to minimize the rate of decomposition though the degradation cannot be completely stopped. There is a need to improve fading property of dyed window film laminates when exposed to prolonged natural exposure conditions by maintaining high clarity standards and one tone fading property.

Alternative method to make tinted PET films is to add organic pigments, organic metal complexes in pressure sensitive adhesives or to apply pigmented coatings on the surface of PET films. These films have severe performance drawbacks as long-term exposure of these coatings to natural weather conditions causes progressive fading and transmittance loss.

Visible light reflectance of the aluminum metallized films has been minimized by combining reflective films with dyed films. Metallized part of the film is generally kept on the outer side whereas the part of the film with the dyed part is kept on the inner side. Despite this arrangement, the dyed portion of the film used fades faster as compared to the metallized portion.

The various methods have been investigated in U.S. Pat. No. 6,294,251, U.S. Pat. No. 5,512,215, U.S. Pat. No. 5,518,810, U.S. Pat. No. 6,191,884 and U.S. Pat. No. 6,404,543 and references therein, to attend the desired level of aesthetics, optics and solar energy rejection properties of laminated window glazing, which includes treating of polymeric films using chemical vapor deposition, sputtering of metals, oxides, thermal vacuum deposition of metals, the coloring of the polymeric films and the combination of metal coated films and dyed films.

U.S. Pat. No. 4,430,366 describes a process for aluminum (Al) oxide deposition on polymeric films. Metal oxide layer is formed in continuous vacuum deposition process. The reactive materials like oxygen, hydrogen sulfide are introduced in metal vapor stream under vacuum using conventional metal deposition apparatus. These films have less moisture vapor transmittance rate and needs longer drying time when installed on window pans. In other approaches, reflective aluminum metal films are sandwich between two dyed films. Al looses it's reflectivity by reacting with surface impurities on the dyed film and glycol traces within the polymer matrices of the colored films and therefore Al metallizing on the dyed film have not been commercially successful. Further metallized films have higher visible light reflectance, which is not desirable. The production of such films also entails higher cost of production.

U.S. Pat. No. 6,833,184 describes window films wherein coloration of the window film is affected by a pigment having small particle size that are coated with a resin binder, which encapsulates the organic pigment particles. The adhesive with the encapsulated organic pigment particles is used to secure one or more film layers of a composite window film structure together. Organic dyes have several limitations as they have low inferior light and weather resistance as compared to inorganic pigments and ceramic materials.

U.S. Pat. No. 6,569,517 in contrast to the others has disclosed a color-tailorable surface-metallized, pigment optical body comprising a single or multiple layer polymeric core comprising at least one layer of a thermoplastic polymer material having dispersed therein a particulate pigment, and a metallic layer located on at least one outer surface of the polymeric core. It may be noted in the invention disclosed in U.S. Pat. No. 6,569,517 that the particulate pigment such as carbon black, diverse metal oxides, sulphides, selinides, silicates, manganates, etc., is to be necessarily dispersed in the single or multiple core polymeric layer. Production of such polymer core layers is commercially unattractive. The process needs several controls and becomes expensive.

U.S. Patent Application Publication No. 2004/0131845 A1 discloses a heat wave shielding resin sheet which has maximum transmittance in the visible light region and at the same time minimum transmittance in the near-infrared region exhibiting strong absorption and is realized by dispersing rare earth hexaboride fine particles such as lanthanum hexaboride ($LaB_6$) as a heat wave shielding component in polycarbonate resin or acrylic resin. Indium containing tin oxide (ITO) fine particles and/or antimony containing tin oxide (ATO) fine particles can be dispersed together with the rare earth hexaboride fine particles.

U.S. Pat. No. 6,319,613 describes a solution for forming a film having a high transmittance and a low reflectivity for visible light, a low transmittance for near infrared radiation, and a surface resistively of at least $10^6$ ohms/square. It contains fine particles of a hexaboride of Yttrium (Y), Lanthanum (La), Cerium (Ce), etc., Strontium (Sr), or Calcium (Ca) and fine particles of ITO or ATO in a weight ratio of from 0.1:99.9 to 90:10. In addition to the hexaboride and ITO or ATO, the solution may contain additional fine particles of at least one oxide selected from the group consisting of silicon dioxide ($SiO_2$), titanium dioxide ($TiO_2$), zirconium dioxide ($ZrO_2$), aluminum oxide ($Al_2O_3$) and magnesium oxide (MgO) with particle diameters up to 200μ. Also disclosed is a film formed on at least one-side of a resin film as a base for cutting off solar heat radiation. Higher concentration of nano material is required to put in coating to make the films having darker tints therefore it is very expensive and is not economical. This technique is used to make the film with visible light transmittance above 60 percent (%).

U.S. Pat. No. 6,953,618 describes a method for achieving predetermined finished colour tone of window film laminate comprising the transparent colour film having colour deficiency in hue, chroma and at least one pigment dispersed in transparent colour matching layer adjacent to film layer, wherein the pigment is iron oxide.

U.S. Pat. No. 6,404,543 describes an infrared (IR) shielding film having excellent visible light transmission and near IR blocking properties. The infrared shielding films are prepared by applying a thin coating layer consisting of ionizing radiation curable resin and Lanthanum as near infrared shielding agent. Xenon Arc Weatherometer exposure results shows that the infrared shielding nano composites are sensitive to humidity, progressively losing near infrared ray blocking property.

U.S. Pat. No. 6,294,251 discloses a method for making colored film where an adhesive is colored with pigments being applied on at least one side surface of transparent film. These films have the severe drawback that when exposed to natural weather conditions they progressively lose visible light transmittance and fade.

The present invention relates to multi layered polyester films with sandwiched adhesive layer with dispersed fine mixed metal oxides as solar-energy-screen particles such as complex oxides of copper and manganese, optionally in combination with hexaborides such as $LaB_6$, and/or ATO, ITO, titanium nitride (TiN) fine particles to give a good tinting strength. The present invention further provides a cost effective process for the manufacture of the product.

SUMMARY OF THE INVENTION

The main object of the invention is to provide solar energy shielding window film laminates that exhibit visual light transmittance in the range of 5 to 80% with minimum progressive fading or degradation of reflective quality.

It is another object of the invention to provide multi layered polyester film laminates with sandwiched adhesive layers containing dispersed mixed metal oxides as solar-energy-screen particles to exhibit desired transmittance in the visible region and at the same time producing minimum transmittance in the near-infrared region without progressive fading or degradation of reflective quality.

It is yet another object of the invention to provide multi layered polyester films for applications related to solar energy shielding film laminates with sandwiched adhesive layer with dispersed mixed metal oxides as solar-energy-screen particles such as complex oxides of copper and manganese, in combination with other rare earth oxides.

It is yet another object of the invention to provide multi layered polyester films for applications related to solar energy shielding film laminates with sandwiched adhesive layer with dispersed mixed complex metal oxides (hereafter referred metal oxides) as solar-energy-screen particles such as complex oxides of copper and manganese, optionally in combination with rare earth hexaborides such as $LaB_6$, and antimony containing tin oxide (here after referred as ATO) or indium containing tin oxide (here after referred as ITO) or titanium nitride (here after referred as TiN) or carbon fine particles.

It is yet another object of the invention to provide a cost effective and commercially viable process for the manufacture of the above mentioned products.

Thus in accordance with this invention, laminated structures of surface metallized and/or non-surface metallized polyester films with sandwiched adhesive layer containing dispersed mixed metal oxides as solar-energy-screen particles resulting in films exhibiting solar energy shielding characteristics.

BRIEF DESCRIPTION OF THE DRAWINGS

FIG. 1 describes spectral characteristics of solar energy control using mixed copper manganese metal oxides as solar-energy-screen particles dispersed in a laminating adhesive which is sandwiched between two layers of polyester film.

FIG. 2 describes spectral characteristics of solar energy control using mixed copper manganese metal oxides as solar-energy-screen particles in combination with lanthanum hexaboride dispersed in the laminating adhesive, which is sandwiched between two layers of polyester film.

FIG. 3 describes spectral characteristics of solar energy control of window film laminate using copper manganese oxides as solar-energy-screen particles in combination with ATO dispersed in the laminating adhesive layer that is sandwiched between two layers of polyester films.

DETAILED DESCRIPTION OF THE INVENTION

The process of the present invention involves following steps:
1) Selecting a PET substrate from commercially available films or preparing same as per the process disclosed in U.S. Pat. Nos. 4,399,265 and 6,316,531, optionally followed by treatment with at least one dye or stabilizer using solvent assisted dyeing;
2) Coating the PET film surface with an adhesive formulation containing dispersed mixed metal oxides as solar-energy-screen particles followed by lamination with one more sheets of PET film;
3) Applying a UV hard coat layer on one side of the PET film composite structure; and
4) Applying a pressure sensitive adhesive on a side opposite the UV hard coat layer of the laminate followed by lamination with a release sheet.

The substrate polyester films of the invention are polymers having ester groups produced by polymerization of dicarboxylic acids and diols, or by ester exchange polymerization of dimethyl terepthalate and monoethylene glycol dicarboxylic acids including terepthalic acid, isopthalic acid, 2,6-napthalene dicarboxylic acid and 1,4-cyclohexane dicarboxylic acid. The diols include monoethylene glycol, diethylene glycol, triethylene glycol and polyethylene glycol. Typical polyesters include polyethylene terephthalate, polyethylene 2,6-naphthalate, and co-polyesters of 1,4-cyclohexane dicarboxylic acid.

The base substrate polyester film also includes "UV stabilized films" with UV stabilizers used from about 0.01 to about 15% preferably in the range of from about 0.05 to about 3%.

The base substrate film used in the present invention is a biaxially oriented polyester film having good dimensional stability. The film has a shrinkage value of less than 10% in the transverse (TD) direction and in the machine direction (MD). The shrinkage and tensile strength values should be the same across the web width and throughout the length. Alternative substrate used in the present invention is dyed UV stabilized films produced by solvent assisted dyeing, the method is described in U.S. Pat. No. 6,216,531. The thickness of the polyester films used in the invention is generally about 12 to about 250µ, preferably between about 12 and about 75µ.

The shrinkage properties are adjusted by stretching the film in the dyeing apparatus and in the tenter chain for achieving the desired shrinkage values in MD and TD direction. MD shrinkage value is a function of base film shrinkage and machine direction stretching above the glass transition temperatures in the dye bath.

Adhesive layer with dispersion of inorganic fine particles is sandwiched between two layers of polyester film, the particle sizes being from about 1 to about 100 nanometers preferably from about 8 to about 40 nanometers. The complex metal oxides as solar-energy-screen particles are selected from copper-chromium (Cu—Cr), copper-iron-manganese (Cu—Fe—Mn), copper-manganese (Cu—Mn), copper-chromium-manganese (Cu—Cr—Mn), copper-chromium-manganese-nickel (Cu—Cr—Mn—Ni), cobalt-chromium-iron (Co—Cr—Fe); optionally with hexaborides such as cerium hexaborides ($CeB_6$), neodymium hexaborides ($NdB_6$), holmium hexaborides ($HoB_6$), erbium hexaborides ($ErB_6$), lanthanum hexaborides ($LaB_6$), ytterbium hexaborides ($YbB_6$), chromium hexaborides ($CrB_6$), calcium hexaborides ($CaB_6$), metal oxides such as iron oxides ($Fe_2O_x$), calcium oxides ($CaO_x$), titanium dioxide ($TiO_2$), metals such as silver (Ag), gold (Au), aluminum (Al), copper (Cu); oxygen (O) and compounds like TiN, ATO, ITO, cobalt blue, carbon black.

Other solar-energy-screen particles such as titanium nitride may preferably be used in the range of from about 1% to about 30% with respect to the dry solids of laminating adhesive, the particle sizes being from about 1 to about 100 nanometers preferably from about 8 to about 40 nanometers optionally in combination with hexaborides such as $CeB_6$, $NaB_6$, $HoB_6$, $LaB_6$, $ErB_6$, $YbB_6$, $CrB_6$, $CaB_6$, compounds like ATO, ITO, cobalt blue and carbon black.

The mixed metal oxides as solar-energy-screen particles with or without other metal oxides are preferably in the range of from about 1% to about 30% with respect to the dry solids of laminating adhesive. Laminating adhesive thickness in the laminate may vary from about 2 to about 8 grams per square meter ($g/m^2$).

Lanthanum hexaboride is preferably in the range of from about 1% to about 20%, more preferably in the range of from about 1 to about 8% with respect to the dry solids of laminating adhesive, which is in combination with the mixed metal oxides. The thickness of the adhesive may vary from about 2 to about 4 $g/m^2$.

ATO and/or ITO is in the range of from about 10% to about 70% preferably in the range of from about 40 to about 60% with respect to dry solids of laminating adhesive, which contains the mixed metal oxides as solar-energy-screen particles. The thickness of the adhesive layer may vary from about 3 to about 12 $g/m^2$.

Laminating adhesive generally comprises of polyol and at least one NCO terminated co-reactant. However acrylic base adhesive, UV Curable Acrylic adhesives may also be used.

The polyurethane base laminating adhesive with the mixed metal oxides as solar-energy-screen particles is diluted to appropriate concentrations using compatible solvents is applied on the surface of polyester film further laminated with one more polyester film using lamination techniques. The adhesive resin should be compatible with surface treated inorganic particles in use.

Organic solvents either singly or in combination used for dilution include aromatic hydrocarbons, such as benzene, toluene, xylene and chlorobenzene; ketones such as acetone and methyl ethyl ketone; esters such as ethyl acetate and butyl acetate; and alcohols such as isopropyl alcohol, tetrahydrofuran and ethanol.

The organic solvent is in the range of from about 10 to about 90% preferably in the range of from about 40 to about 85% with respect to dry solids of laminating adhesive and solar-energy-screen particles.

Suitable surface treating agents include glycidyloxyproyl-trimethoxy silane, glycidyloxy-propyl triethoxy silane, 3-amino propyl trimethoxy silane, methyl trimethoxy silane, tetraethoxysilane.

Hydroyzable silane such as alkoxy, chlorosilanes may also be used to stabilize de-agglomerated inorganic particles. Dispersion aids, flow additives, de-foamers, deareators and mixtures thereof may be incorporated in coated batch to achieve desired optical properties. Examples of dispersants include anionic surfactants such as salts of carboxylic acids, salts of sulfonic acid, and their like.

Dispersion is prepared using a dispenser such as sand mill, colloidal mill, ball mill, horizontal bead mill and high-pressure homogenizer.

The laminating adhesive with the dispersed particles is applied on the polyester film by Gravure roll, Mayer bar, Dye coater or Knife coating. The wet coating is dried in forced air circulated oven at 70 to 120° C. followed by lamination with one more sheet of polyester films so as to sandwich the adhesive layer between two layers of the polyester films.

The laminate has visible light transmittance from 3% to 80%.

In an embodiment, a flexible UV stabilized PET film substrate is vacuum deposited with an aluminum metal layer. Laminating adhesive layer containing the mixed metal oxides as solar-energy-screen particles is sandwiched between a clear polyester film layer and the aluminium metal layer. Thickness of adhesive coating is in the range of 2µ to 10µ. UV Hard coat layer is applied on the clear polyester film layer. Acrylic pressure sensitive adhesive layer is formed on the UV stabilized film layer, which is further protected with a release sheet.

In another embodiment, a lower surface of a first flexible PET film is vacuum deposited with a stoichiometric mixture of metal and its oxides. Laminating adhesive in the form of a dispersion of mixed metal oxides as solar-energy-screen particles in a polyurethane base coating layer is sandwiched between the metallized lower surface of the first PET film and an upper surface of a second PET film. Thickness of the adhesive coating is preferably from 2µ to 10µ. A UV hard coat layer is formed on an upper surface of the first PET film. Acrylic pressure sensitive adhesive layer is formed on a lower surface of the second PET film, which is further protected with a release sheet.

In another embodiment, UV hard coat layer is formed on the surface of clear PET film. Laminating adhesive with the mixed metal oxides as solar-energy-screen particles is made as in Example 2, is sandwiched in between the UV stabilized PET film and PET film. Acrylic pressure sensitive adhesive is applied on the surface of PET film layer, which is further protected with a release sheet.

In another embodiment, the UV hard coat layer is formed on the surface of clear PET film. Aluminum metallized film layer is formed on the PET film layer by vacuum deposition technique further sandwiched in between two PET film layers via laminating adhesive containing the mixed metal oxides as solar-energy-screen particles made as in Example 1. Acrylic pressure sensitive adhesive is applied on the surface of PET film layer, which is further protected with a release sheet.

Testing

The laminates were tested for thermal stability in a forced air circulated oven at 150° C., dwell time 30 minutes in accordance with ASTM 1204.90. Ageing behavior was studied in oven at 70° C. for 1000 hrs.

The samples were tested for peel strength and mechanical properties retention. Visual light transmittance was recorded on Haze Gard Plus instrument manufactured by BYK Gardner. The accelerated weathering test was performed on the equipment "Xenon Accelerated Weathering tester" manufactured by Atlas model CI 65, USA. Xenon type lamp was used. Testing was performed at Irradiance 0.55 watts per square meter (W/m$^2$) @ 340 nm; 3.8 hours light, 1.0 hour dark cycle; Relative Humidity: 50% (light cycle), 95% (dark cycle); Black Panel Temperature: 70° C. (light cycle), 38° C. (dark cycle).

Example No. 1

Preparation of laminate with mixed metal oxides as solar-energy-screen particles in the laminating adhesive layer.

Dispersion of mixed metal oxides as solar-energy-screen particles under trade name WRF-20S hereafter referred to as "B" was mixed with laminating adhesive under tradename Adcote™ and co-reactant under tradename 9H1H (96.2: 3.8% proportion) hereafter referred to as "A" followed by stirring in agitator for 30 minutes, further diluted using toluene as solvent to achieve good optical properties.

Laminating adhesive along with above solar energy shielding nanoparticles were applied on one surface of non UV stabilized PET film by conventional gravure roll coating technique followed by drying at 110° C., to achieve dry weight of 2.5 to 4.5 g/m$^2$, followed by lamination with 23μ clear UV stabilized film. This coated film was referred to as film "X". Solar energy shielding nano composites were well protected in between two layers of polyester film against attack of humidity and UV radiations.

23μ silicon resin coated film was coated with acrylic pressure sensitive adhesive using Mayer bar on the silicon treated side. Coated film sample was dried at 120° C. to achieve dry coat weight of 6 g/m$^2$. This coated film was referred to as film "Y".

Pressure sensitive adhesive coated surface of film "Y" was laminated with film "X" using lamination assembly.

Laminates produced by using above technique were laminated on one side surface with ⅛" clear float glass by regular procedure adopted by the industry and then tested for solar performance characteristics on the equipment manufactured by Perkin Elmer Model No. Lambda 950 UV VIS-NIR Spectrophotometer. The spectral data integrated against the ASTM E-891-87 air mass 1.5 direct normal spectrum utilizing 109 weighted ordinates. Results are provided in Table no 1.

TABLE NO. 1

| Sr No | Ratio A:B | % Visible Transmittance | % Solar Transmittance | % Solar Reflectance | % Solar Absorptance |
|---|---|---|---|---|---|
| Sample 1 | 1:0.8 | 21.1 | 32.4 | 5.8 | 61.8 |
| Sample 2 | 1:0.55 | 33.2 | 42.1 | 6.8 | 54.1 |
| Sample 3 | 1:0.27 | 50.3 | 52.8 | 7.5 | 39.6 |
| Sample 4 | 1:0.135 | 67.2 | 66.7 | 8.4 | 24.9 |

Optical spectra of sample nos. 1, 2, 3, 4 presented in FIG. 1 show relatively higher absorption in the visible as compared to the absorption in the near IR range.

Accelerated weathering studies were conducted to assess the colour stability of the window film laminates produced using above technique. Samples of 2"×4" size were applied on clear float glass and exposed to "Xenon Accelerated Weathering tester" manufactured by Atlas laboratory, model CI 65, under the following conditions: Irradiance 0.55 W/m2 @ 340 nm; 3.8 hours light, 1.0 hour dark cycle; Relative Humidity: 50% (light cycle), 95% (dark cycle). Measurements were done on a spectrophotometer manufactured by Hunterlab, model Ultrascan XE and the results are expressed in terms of L*, a*, b* in transmittance mode based on CIE method (Table 2).

TABLE NO. 2

| | Before Weathering | | | After 2000 hrs Weathering | | | |
|---|---|---|---|---|---|---|---|
| Sr. No | L* | a* | b* | L* | a* | b* | ΔE* |
| Sample 1 | 51.36 | −1.36 | 0.92 | 52.49 | −1.19 | −2.41 | 3.51 |
| Sample 2 | 63.6 | −1.42 | 1.15 | 64.96 | −1.23 | −1.81 | 3.26 |
| Sample 3 | 76.91 | −1.3 | 1.24 | 77.26 | −1.22 | −0.16 | 1.44 |
| Sample 4 | 86.24 | −1.26 | 1.39 | 85.99 | −1.17 | 0.35 | 1.07 |

Accelerated weather test results for control samples reduced by solvent dyeing technique had total colour difference ΔE* of 24.3 for sample with visible light transmission 21%. It may be noted that sample 1 which had transmission of 21% when subjected to accelerated weathering test exhibited significant improvement of ΔE* of 3.51. Color difference ΔE* was based on CIELAB method using illuminant D65 Observer angle 10°.

Example No 2

Preparation of laminate with mixed metal oxides as solar-energy-screen particles in the laminating adhesive layer; the base film used was metallized.

In this example, the optically clear UV stabilized film in example 1 was replaced by 23μ pre-metallized films having visible light transmission 50, 35 and 20% as the base film and the laminate was prepared as in Example 1. The pressure sensitive adhesive was applied on an opposite side surface of the metallized film while preparing the laminate. The optical properties of the samples 5-7 given in Table no. 3 indicate that the samples containing the mixed metal oxides as solar-energy-screen particles in the adhesive layer reduce the interior visible light reflectivity as compared to the corresponding control samples without the mixed metal oxides.

TABLE NO. 3

| Sr No | Ratio A:B | % Visible Transmittance | % Visible Reflectance Interior | % Visible Reflectance Exterior | % Solar Absorption | % Solar Reflection | % Solar Transmittance |
|---|---|---|---|---|---|---|---|
| Sample 5* | 1:0.135 | 38 | 13 | 19 | 47 | 19 | 34 |
| Control sample for sample 5 | 1:0 | 55 | 20 | 21 | 36 | 20 | 44 |
| Sample 6* | 1:0.135 | 27 | 23 | 35 | 45 | 32 | 23 |
| Control sample for sample 6 | 1:0 | 37 | 35 | 37 | 37 | 34 | 29 |
| Sample 7* | 1:0.135 | 13 | 22 | 52 | 43 | 47 | 10 |
| Control Sample for sample 7 | 1:0 | 24 | 53 | 50 | 37 | 45 | 18 |

Sample no 5* - Metallized film had visible transmittance 53%
Sample no 6* - Metallized film had visible transmittance 34%
Sample no 7* - Metallized film had visible transmittance 19%

It is clear from the results in Table 3 that metallized base films give substantial reduction in the interior and exterior reflection.

Example No. 3

Preparation of laminate with mixed metal oxides in combination with $LaB_6$ as solar-energy-screen particles in the laminating adhesive layer; the base film used was clear UV stabilized.

The laminates were prepared as in Example 1 wherein $LaB_6$ was incorporated in the adhesive layer with the mixed metal oxides. The optical properties are given in Table 4. When compared to Table 1, addition of $LaB_6$ reduced the total solar energy transmission but enhanced the total solar energy rejection. The optical spectra indicate that addition of $LaB_6$ increases the absorption in the near IR region.

TABLE NO. 4

| Sr. No | Ratio A:B:C | % Visual transmittance | % Solar Transmittance | % Solar Reflectance | % Solar Absorption | TSER* |
|---|---|---|---|---|---|---|
| Sample 8 | 1:0.135:0.9 | 55 | 41 | 7 | 52 | 43 |
| Sample 9 | 1:0.27:0.9 | 42 | 33 | 7 | 60 | 49 |
| Sample 10 | 1:0.55:0.9 | 27 | 26 | 6 | 68 | 54 |
| Sample 11 | 1:0.80:0.9 | 16 | 19 | 6 | 75 | 58 |

TSER*—Total Solar Energy Rejection

Example No. 4

Preparation of laminate with mixed metal oxides in combination with ATO as solar-energy-screen particles in the laminating adhesive layer; the base film used was clear UV stabilized.

The laminates were prepared as in Example 1 wherein ATO (herein termed d) was incorporated in the adhesive layer with the mixed metal oxides in ratios A:B:D of 1:0.0675:2.52 (sample 12); 1:0.135:2.52 (sample 13); 1:0.275:2.52 (Sample 14); 1:0.40:2.52 (sample 15). The optical spectra in FIG. 3 indicate that addition of $LaB_6$ increases the absorption in the near IR region.

It should be understood that the invention is not limited to the particular embodiments shown and described herein, but that various changes and modifications may be made without departing from the spirit or scope of the claimed invention.

What is claimed is:

1. A solar energy shielding window film laminate exhibiting visual light transmittance in the range of 5 to 80%, which comprises: at least two polyester films; and at least one layer of adhesive contained between the polyester films, wherein the at least one adhesive layer comprises a polyurethane base laminating adhesive having solar-energy-screen particles dispersed therein, wherein the solar-energy-screen particles comprise: complex metal oxides, wherein combinations of main metals in the complex metal oxides are selected from the group of Cu—Cr, Cu—Fe—Mn, Cu—Mn, Cu—Cr—Mn, Cu—Cr—Mn—Ni, Co—Cr—Fe and combinations thereof; and one or more hexaborides.

2. The solar energy shielding window film laminate of claim 1, wherein at least one polyester film is an optically clear, optionally ultraviolet stabilized, polyester film.

3. The solar energy shielding window film laminate of claim 1, wherein at least one polyester film is a dyed, ultraviolet stabilized, polyester film.

4. The solar energy shielding window film laminate of claim 1, wherein at least one polyester film is a metallized polyester film.

5. The solar energy shielding window film laminate of claim 1, wherein at least one polyester film is a biaxially oriented polyester film, which demonstrates a thermal shrinkage of less than 10% in both the machine and transverse directions.

6. The solar energy shielding window film laminate of claim 1, wherein at least one polyester film has a thickness ranging from about 12 to about 250 microns.

7. The solar energy shielding window film laminate of claim 6, wherein at least one polyester film has a thickness ranging from about 12 to about 75 microns.

8. The solar energy shielding window film laminate of claim 1, wherein at least one polyester film is prepared from polymers having ester groups produced by either polymerization of dicarboxylic acids and diols, or by ester exchange polymerization of dimethyl terephthalate and monoethylene glycol.

9. The solar energy shielding window film laminate of claim 8, wherein the at least one polyester film is prepared from polymers having ester groups produced by polymerization of dicarboxylic acids and diols, wherein the dicarboxylic acids are selected from the group of terepthalic acid, isopthalic acid, 2,6-napthalene dicarboxylic acid and 1,4-cyclohexane dicarboxylic acid, and wherein the diols are selected from the group of monoethylene glycols, diethylene glycols, triethylene glycols, polyethylene glycols, and combinations thereof.

10. The solar energy shielding window film laminate of claim 1, wherein at least one polyester film is a film prepared from polyesters selected from the group of polyethylene terephthalate, polyethylene 2,6-naphthalate, and co-polyesters of 1,4-cyclohexane dicarboxylic acid.

11. The solar energy shielding window film laminate of claim 1, wherein the at least one adhesive layer contains from about 1 to about 30% by dry weight, based on the total dry weight of laminating adhesive, of dispersed complex metal oxides.

12. The solar energy shielding window film laminate of claim 11, wherein the at least one adhesive layer further contains from about 1 to about 8% by dry weight, based on the total dry weight of the laminating adhesive, of at least one hexaboride selected from the group of hexaborides of cesium, neodymium, holmium, erbium, lanthanum, ytterbium, chromium and calcium, and combinations thereof.

13. The solar energy shielding window film laminate of claim 11, wherein the at least one adhesive layer further contains from about 10 to about 70% by dry weight, based on the total dry weight of the laminating adhesive, of at least one metal oxide selected from the group of antimony containing metal oxides, indium containing metal oxides, and combinations thereof.

14. The solar energy shielding window film laminate of claim 13, wherein the at least one metal oxide is present in an amount ranging from about 40 to about 60% by dry weight, based on the total dry weight of the laminating adhesive.

15. The solar energy shielding window film laminate of claim 13, wherein the at least one metal oxide is antimony tin oxide.

16. The solar energy shielding window film laminate of claim 13, wherein the at least one metal oxide is indium tin oxide.

17. The solar energy shielding window film laminate of claim 1, wherein the solar-energy-screen particles have an average particle size ranging from about 1 to about 100 nanometers.

18. The solar energy shielding window film laminate of claim 17, wherein the solar-energy-screen particles have an average particle size ranging from about 8 to about 40 nanometers.

19. The solar energy shielding window film laminate of claim 1, wherein the polyurethane base laminating adhesive is prepared from a polyol and at least one NCO-terminated co-reactant.

20. The solar energy shielding window film laminate of claim 1, wherein one or more organic solvents are used to disperse the solar-energy-screen particles in the laminating adhesive, the one or more organic solvents being selected from the group of aromatic hydrocarbons, esters, alcohols, and mixtures thereof.

21. The solar energy shielding window film laminate of claim 1, wherein the at least one adhesive layer is prepared from an adhesive formulation comprising: a laminating adhesive; solar-energy-screen particles; and from about 10 to about 90% by weight, based on the total dry weight of the laminating adhesive and solar-energy-screen particles, of one or more organic solvents.

22. The solar energy shielding window film laminate of claim 21, wherein the one or more organic solvents is present in the adhesive formulation in an amount ranging from about 40 to about 85% by weight, based on the total dry weight of the laminating adhesive and solar-energy-screen particles.

23. The solar energy shielding window film laminate of claim 1, wherein the at least one adhesive layer has a thickness ranging from about 2 microns to about 10 microns.

24. The solar energy shielding window film laminate of claim 1, which comprises:
   (a) a first polyester film having opposing upper and lower surfaces;
   (b) a second polyester film having opposing upper and lower surfaces and metal deposited on its upper surface;
   (c) an adhesive layer having a thickness ranging from about 2 to about 10 microns that is contained between and that adheres together the lower surface of the first polyester film and the upper metallized surface of the second polyester film, wherein the adhesive layer comprises a polyurethane base laminating adhesive having solar-energy-screen particles dispersed therein, wherein the solar-energy-screen particles comprise Cu—Fe—Mn complex metal oxides in combination with one or more hexaborides;
   (d) a hard coat layer formed by an ultraviolet curable resin that is located on the upper surface of the first polyester film;
   (e) a pressure sensitive adhesive layer located on the lower surface of the second polyester film; and
   (f) a release sheet located on the pressure sensitive adhesive layer.

25. The solar energy shielding window film laminate of claim 1, which comprises:
   (a) a first polyester film having opposing upper and lower surfaces and a stoichiometric mixture of metal and its oxides deposited on its lower surface;
   (b) a hard coat layer located on the upper surface of the first polyester film;
   (c) a second polyester film having opposing upper and lower surfaces;
   (d) an adhesive layer having a thickness ranging from about 2 to about 10 microns that is contained between and that adheres together the metallized lower surface of the first polyester film and the upper surface of the second polyester film, wherein the adhesive layer comprises a polyurethane base laminating adhesive having solar-energy-screen particles dispersed therein, wherein the solar-energy-screen particles comprise complex metal oxides in combination with one or more hexaborides, wherein combinations of main metals in the complex metal oxides are selected from the group of Cu—Cr, Cu—Fe—Mn, Cu—Mn, Cu—Cr—Mn, Cu—Cr—Mn—Ni, Co—Cr—Fe and combinations thereof;

(e) a pressure sensitive adhesive layer formed on the lower surface of the second polyester film; and (f) a release sheet located on the pressure sensitive adhesive layer.

26. The solar energy shielding window film laminate of claim 1, which comprises:

(a) an optically clear polyester film having opposing upper and lower surfaces;

(b) a hard coat layer formed by an ultraviolet curable resin that is located on the upper surface of the optically clear polyester film;

(c) an ultraviolet stabilized polyester film having opposing upper and lower surfaces;

(d) an adhesive layer that is contained between and that adheres together the lower surface of the optically clear polyester film and the upper surface of the ultraviolet stabilized polyester film, wherein the adhesive layer comprises a polyurethane base laminating adhesive having solar-energy-screen particles dispersed therein, wherein the solar-energy-screen particles comprise complex metal oxides, wherein combinations of main metals in the complex metal oxides are selected from the group of Cu—Cr, Cu—Fe—Mn, Cu—Mn, Cu—Cr—Mn, Cu—Cr—Mn—Ni, Co—Cr—Fe and combinations thereof, and one or more;

(e) a pressure sensitive adhesive layer located on the lower surface of the ultraviolet stabilized polyester film; and (f) a release sheet located on the pressure sensitive adhesive layer.

27. The solar energy shielding window film laminate of claim 1, which comprises:

(a) a first polyester film in the form of an optically clear film having opposing upper and lower surfaces;

(b) a hard coat layer formed by an ultraviolet curable resin that is located on the upper surface of the first polyester film;

(c) a second polyester film having opposing upper and lower surfaces, wherein the upper surface of the second polyester film is adhered to the lower surface of the first polyester film;

(d) a third polyester film having opposing upper and lower surfaces and metal deposited on its upper surface, wherein the upper metallized surface of the third polyester film is adhered to the lower surface of the second polyester film;

(e) a fourth polyester film having opposing upper and lower surfaces, wherein the upper surface of the fourth polyester film is adhered to the lower surface of the third polyester film;

(f) a pressure sensitive adhesive layer formed on the lower surface of the fourth polyester film; and (g) a release layer or sheet located on the pressure sensitive adhesive layer, wherein, adhesive layers are contained between and adhere together the polyester films, wherein each adhesive layer comprises a polyurethane base laminating adhesive having solar-energy-screen particles dispersed therein, wherein the solar-energy-screen particles comprise complex metal oxides, wherein combinations of main metals in the complex metal oxides are selected from the group of Cu—Cr, Cu—Fe—Mn, Cu—Mn, Cu—Cr—Mn, Cu—Cr—Mn—Ni, Co—Cr—Fe and combinations thereof, and one or more hexaborides.

28. A solar energy shielding window film laminate, which comprises: at least two polyester films; and at least one layer of adhesive contained between the polyester films, wherein the at least one adhesive layer comprises a polyurethane base laminating adhesive having solar-energy-screen particles dispersed therein, wherein the solar-energy-screen particles comprise complex metal oxides, wherein combinations of main metals in the complex metal oxides are selected from the group of Cu—Cr, Cu—Fe—Mn, Cu—Mn, Cu—Cr—Mn, Cu—Cr—Mn—Ni, Co—Cr—Fe and combinations thereof, and one or more hexaborides, wherein the at least one adhesive layer is prepared from an adhesive formulation consisting essentially of: the polyurethane laminating adhesive; the solar-energy-screen particles; and from about 10 to about 90% by weight, based on the total dry weight of the laminating adhesive and solar-energy-screen particles, of one or more organic solvents.

29. A solar energy shielding window film laminate, which comprises: at least two polyester films; and at least one layer of adhesive contained between the polyester films, wherein the at least one adhesive layer comprises a polyurethane base laminating adhesive having solar-energy-screen particles dispersed therein, wherein the solar-energy-screen particles consist essentially of complex metal oxides, wherein combinations of main metals in the complex metal oxides are selected from the group of Cu—Cr, Cu—Fe—Mn, Cu—Mn, Cu—Cr—Mn, Cu—Cr—Mn—Ni, Co—Cr—Fe and combinations thereof, and one or more hexaborides.

30. The solar energy shielding window film laminate of claim 29, wherein the one or more hexaborides is selected from the group of hexaborides of cesium, neodymium, holmium, erbium, lanthanum, ytterbium, chromium and calcium, and combinations thereof.

31. The solar energy shielding window film laminate of claim 30, wherein the at least one adhesive layer contains from about 1 to about 8% by dry weight, based on the total dry weight of the adhesive, of the one or more hexaborides.

32. The solar energy shielding window film laminate of claim 30, wherein the one or more hexaborides is lanthanum hexaboride.

* * * * *